US012017906B2

(12) United States Patent
Guler et al.

(10) Patent No.: US 12,017,906 B2
(45) Date of Patent: Jun. 25, 2024

(54) MATTRESS PRODUCTION LINE

(71) Applicant: ELEKTROTEKS ELEKTRONIK TEKSTIL SAN. VE TIC. LTD. STI., Bursa (TR)

(72) Inventors: Serkan Guler, Bursa (TR); Orhan Guler, Bursa (TR)

(73) Assignee: ELEKTROTEKS ELEKTRONIK TEKSTIL SAN. VE TIC. LTD. STI., Bursa (TR)

( * ) Notice: Subject to any disclaimer, the term of this patent is extended or adjusted under 35 U.S.C. 154(b) by 265 days.

(21) Appl. No.: 17/773,076

(22) PCT Filed: Jun. 8, 2021

(86) PCT No.: PCT/TR2021/050551
§ 371 (c)(1),
(2) Date: Apr. 29, 2022

(87) PCT Pub. No.: WO2022/146293
PCT Pub. Date: Jul. 7, 2022

(65) Prior Publication Data

US 2023/0150812 A1 May 18, 2023

(51) Int. Cl.
*B68G 7/04* (2006.01)

(52) U.S. Cl.
CPC .................................... *B68G 7/04* (2013.01)

(58) Field of Classification Search
CPC ...................................................... B68G 7/04
See application file for complete search history.

(56) References Cited

U.S. PATENT DOCUMENTS

2020/0376824 A1* 12/2020 Covone .................... B32B 7/14

FOREIGN PATENT DOCUMENTS

| | | | | |
|---|---|---|---|---|
| CN | 206265880 | U | * | 6/2017 |
| CN | 209644457 | U | | 11/2019 |
| CN | 107207238 | B | * | 7/2020 |
| EP | 0764608 | B1 | | 4/2001 |
| KR | 102116216 | B1 | | 5/2020 |

* cited by examiner

*Primary Examiner* — Jeffry H Aftergut

(74) *Attorney, Agent, or Firm* — Bayramoglu Law Offices LLC

(57) ABSTRACT

A mattress production line for use in mattress production includes at least one adhesion bridge, and at least one assembly unit provided in the vicinity of the adhesion bridge and where the parts, forming the mattress, are joined. The improved mattress production line is that in order to provide transfer of a bending element used in mattress production and of a first component and of a second component, which can essentially be positioned on mutual sides of the bending element, to an assembly unit within a predetermined arrangement; the subject matter mattress production line includes a driving unit having at least one lower conveyor and at least one upper conveyor positioned at the upper vicinity of the lower conveyor, and at least one guidance conveyor configured to feed the element, which forms the mattress, to at least one of the lower conveyor and the upper conveyor in the driving unit.

7 Claims, 5 Drawing Sheets

MATTRESS PRODUCTION LINE

CROSS REFERENCE TO THE RELATED APPLICATIONS

This application is the national phase entry of International Application No. PCT/TR2021/050551, filed on Jun. 8, 2021, which is based upon and claims priority to Turkish Patent Application No. 2020/21932, filed on Dec. 28, 2020, the entire contents of which are incorporated herein by reference.

TECHNICAL FIELD

The present invention relates to at least one mattress production line for use in mattress production and comprising at least one adhesion bridge, and at least one assembly unit provided in the vicinity of said adhesion bridge and where the parts, forming the mattress, are joined.

BACKGROUND

Mattresses are used as household goods which are lied down onto for purposes like sleeping, having a rest. In mattress structure, there are lower sponge, upper sponge and springs positioned in between. In order to prevent viewing of the springs from outside, there are lateral sponges which are from the edges of the lower sponge and the upper sponge towards each other. Thanks to the sponges, the user, who contacts the mattress, is prevented from feeling the hardness of the springs directly, and at the same time, the lateral part of the mattress is supported. The springs provide comfortable lying and seating for the user.

In mattress production, first of all, the spring element is positioned on the lower sponge or on the felt, and the upper sponge or felt is positioned thereon. Said lateral sponge is connected by adhering to the lower sponge and to the upper sponge. Thanks to this, the springs are isolated from the outer medium, and the whole periphery of the mattress is made suitable to the person usage conditions.

In mattress production, in the process of adhering and joining of the upper sponge to the lateral sponges, the upper sponge, whereon adhesive is applied, is held by the operators and is placed onto the lateral sponges, and thereby mattress production is provided. Because of the flexion of the spring element and because of the non-rigid structure of the sponges, offset faults can occur while the sponges are being adhered to each other. Even though these faults can be eliminated manually by the workers as much as possible, production faults cannot be avoided. Besides, since the upper sponge is carried and placed by operators, this leads to extra labor force and cost.

As a result, because of the abovementioned problems, an improvement is required in the related technical field.

SUMMARY

The present invention relates to a mattress production line, for eliminating the abovementioned disadvantages and for bringing new advantages to the related technical field.

An object of the present invention is to provide a mattress production line where the production process is accelerated.

In order to realize the abovementioned objects and the objects which are to be deducted from the detailed description below, the present invention is at least one mattress production line for use in mattress production and comprising at least one adhesion bridge, and at least one assembly unit provided in the vicinity of said adhesion bridge and where the parts, forming the mattress, are joined. Accordingly, the improvement is that in order to provide transfer of a bending element used in mattress production and of a first component and of a second component, which can essentially be positioned on mutual sides of said bending element, to an assembly unit within a predetermined arrangement; the subject matter mattress production line comprises a driving unit having at least one lower conveyor and at least one upper conveyor positioned at the upper vicinity of said lower conveyor, and at least one guidance conveyor configured to feed the element, which forms the mattress, to at least one of said lower conveyor and said upper conveyor in said driving unit. Thus, a mattress production line is obtained with facilitated production.

In a possible embodiment of the present invention, in order to provide adhering by reversing at least one of a first component and a second component, whereon adhesive is applied, onto a bending element provided at the assembly unit, the upper conveyor is configured to be at least partially moved between at least one first position, provided in the vicinity of the guidance conveyor at the driving unit, and at least one second position, where the upper conveyor is approached towards the assembly unit. Thus, the first component and the second component can be reversed and adhered onto the bending element.

In a possible embodiment of the present invention, at least one tilt arm is provided in said assembly unit. Thus, the bending element can be reversed in the assembly unit when needed. In another possible embodiment of the present invention, at least one press bridge is provided in the vicinity of the assembly unit. Thus, the adhesion quality is increased by pressing the adhered elements to each other.

In another possible embodiment of the present invention, said guidance conveyor is configured to be aligned with the lower conveyor and with the upper conveyor at the side of the guidance conveyor facing the driving unit. Thus, the elements which form the mattress in mattress production are transferred to the assembly unit at predetermined positions.

In another possible embodiment of the present invention, the guidance conveyor is positioned on at least one conveyor body, and the height of the guidance conveyor is changeable by means of moving at least one hinged arm provided between said conveyor body and said guidance conveyor. Thus, the elements which form the mattress in mattress production are transferred to the assembly unit at predetermined positions.

In another possible embodiment of the present invention, at least one keeping part, where the mattress components can be kept, is provided. Thus, the operator can realize waiting between sending the mattress components.

DETAILED DESCRIPTION OF THE EMBODIMENTS

In this detailed description, the subject matter is explained with references to examples without forming any restrictive effect only in order to make the subject more understandable.

Figure 1:
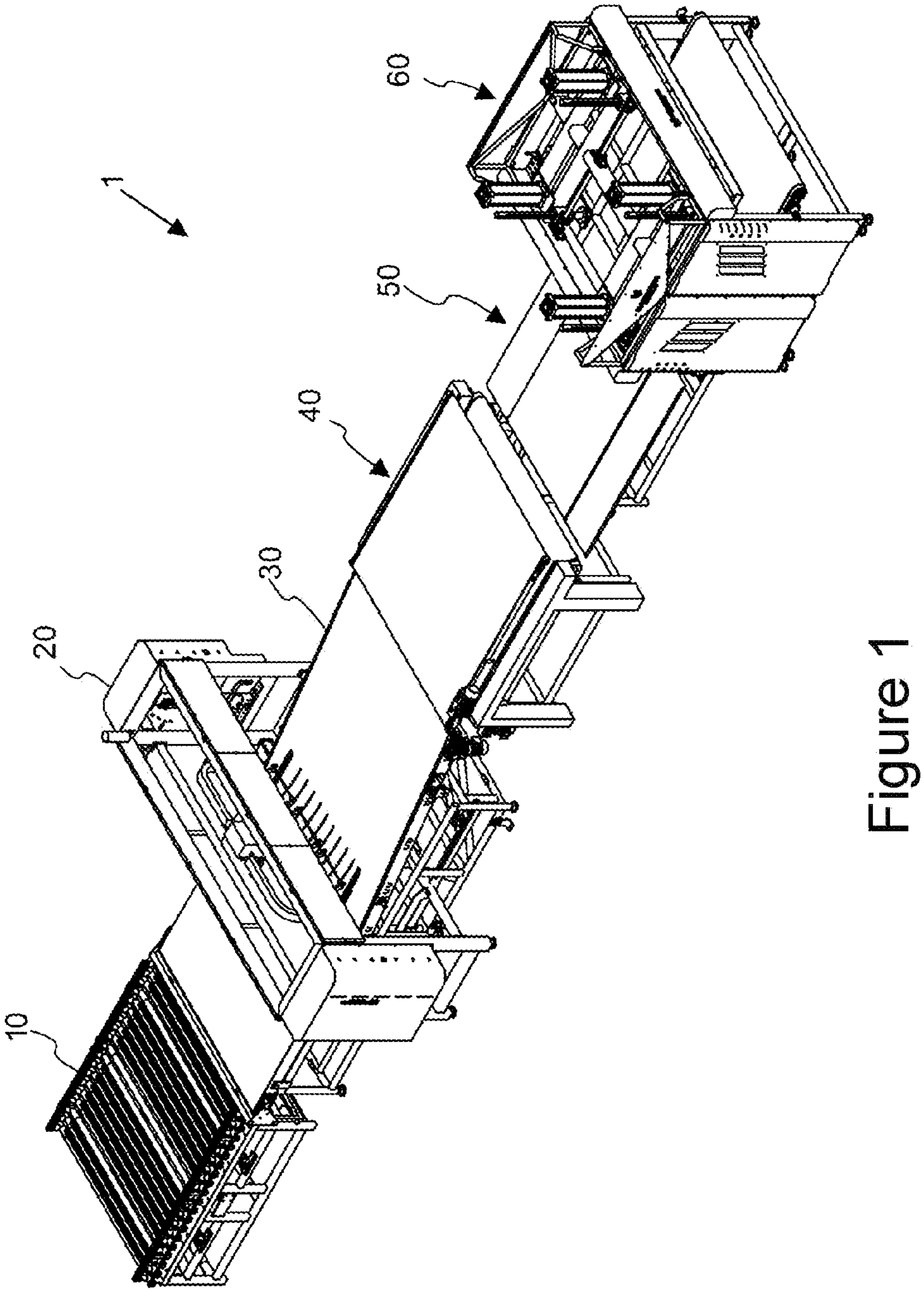
In FIG. 1, a representative perspective view of the subject matter mattress production line is given.

In FIG. 1, a representative perspective view of the subject matter mattress production line (1) is given. Accordingly, in said mattress production line (1), the production of mattresses which can be used in places like houses, hotels, etc. is realized. In the invention, said mattress can be a lying element provided so as to have various forms and characteristics. The elements forming the mattress are at least one bending element provided between a first component and a second component. Moreover, there can be at least one wedge at the outer side of the bending element, between the first component and the second component. The first component, the second component and the wedge are essentially made of sponge and fabric-based materials and can be joined with each other by means of an adhesive.

Figure 3:
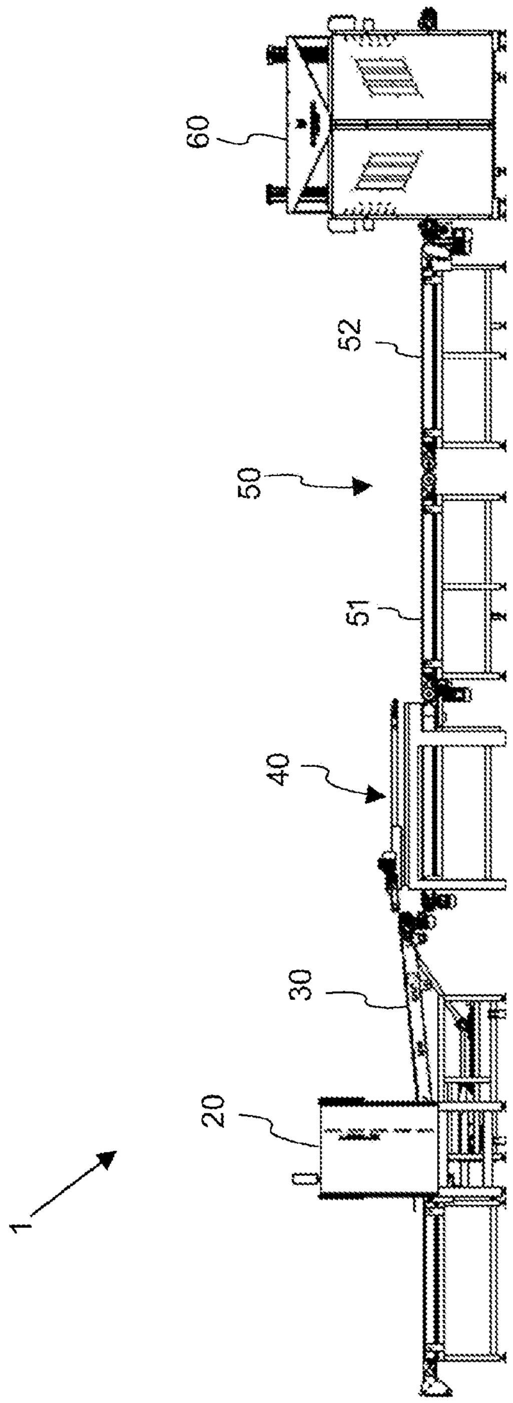
In FIG. 3, a representative lateral view of the subject matter mattress production line is given.

In FIG. 3, a representative lateral view of the subject matter mattress production line (1) is given. In the mattress production line (1), the elements which form the mattress are essentially advanced by means of conveyors continuously and afterwards said elements are joined. In the mattress production (1) line, in accordance with the production order, at least one adhesion bridge (20) is provided which can apply adhesive to the first component and to the second component, and a guidance conveyor (30) is positioned which is provided after said adhesion bridge (20). At the continuation of said guidance conveyor (30), there is at least one driving unit (40) which can provide advancing of the mattress component, and there is an assembly unit (50) where joining is realized. At the continuation of the assembly unit (50), a mattress production line (1) is completed with a press bridge (60).

In the mattress production line (1), there is at least one keeping part (10) where the elements, forming the mattress, can be kept before being given to said adhesion bridge (20). Said keeping part (10) essentially has a plane formed by cylinders, which can rotate in an idle manner around thereof, by bringing together said cylinders. In the keeping part (10), the operator can give the components by waiting said components, which form the mattress, to the mattress production line (1) respectively.

The adhesion bridge (20) is the part which applies adhesive to the elements, used in mattress production, for joining said elements. Preferably the first component and the second component are configured such that adhesive can be applied thereon in mattress production. For this reason, valves, which allow adhesive flow, can be provided on the adhesion bridge (20). Besides, at the adhesion bridge (20), there can be an alignment element in order for the first component and the second component to enter the line at a predetermined position. In this part, the mattress component can be advanced by means of a conveyor element. There is at least one guidance conveyor (30) at the continuation of the adhesion bridge (20). After adhesive is applied onto the first component and onto the second component, advancing is provided to the guidance conveyor (30).

Figure 4:
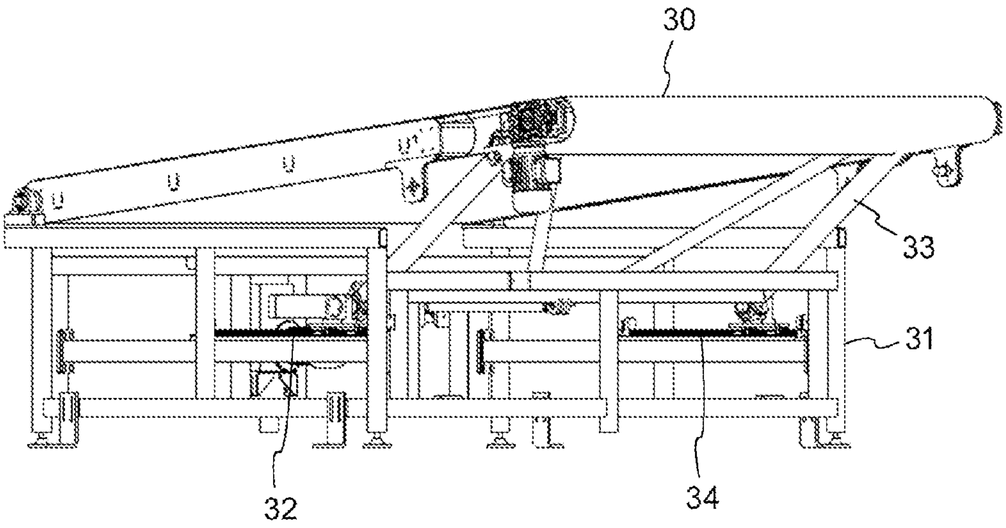
In FIG. 4, a representative lateral view of the guidance conveyor provided in the subject matter mattress production line is given.

In FIG. 4, a representative lateral view of the guidance conveyor (30) provided in the subject matter mattress production line (1) is given. Accordingly, the guidance conveyor (30) provides the components, which form the mattress, to be given to the driving unit (40) at two different positions. This is changing depending on the production type and the element carried on the guidance conveyor (30). The guidance conveyor (30) is positioned on at least one conveyor body (31). There is at least one drive element (32) on said conveyor body (31) and the guidance conveyor (30) can be at least partially moved on the driving unit (40) side. In order to realize this, the drive element (32) is associated with at least one hinged arm (33) on the conveyor body (31). Said hinged arm (33) is connected so as to have rotational freedom on the guidance conveyor (30) from one side and it can realize sliding movement on at least one guide (34), provided on the conveyor body (31), from the other side. This sliding movement provided by means of the drive element (32) can raise and lower the guidance conveyor (30). In the other possible embodiments of the present invention, the guidance conveyor (30) can have a structure which can rise and lower with respect to the floor directly. In such structures, the movement of the guidance conveyor (30) can be provided by means of a shear or gantry mechanism. Depending on this movement, the mattress component can be transferred at two different positions from the guidance conveyor (30) to the driving unit (40).

Figure 5:
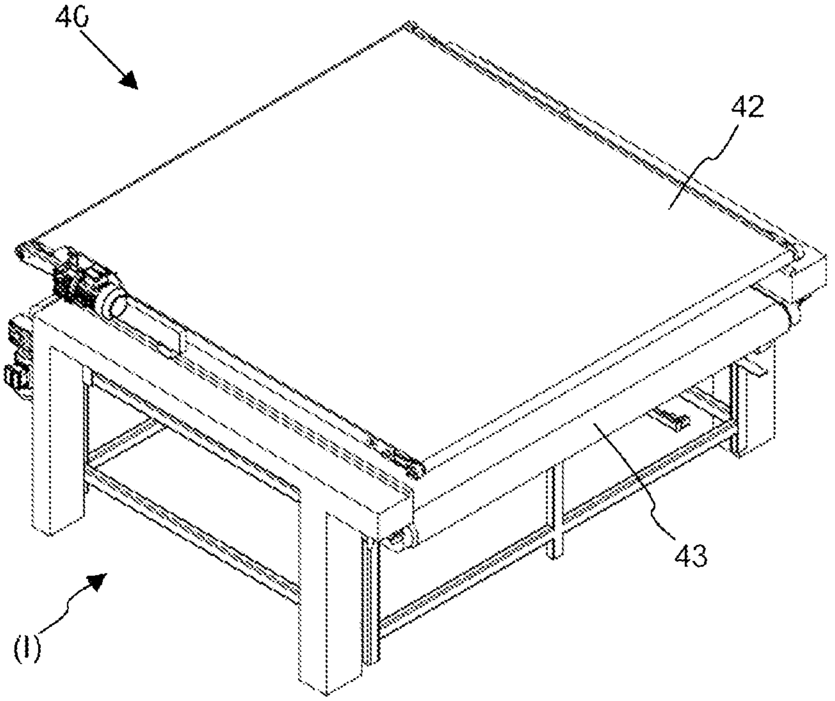
In FIG. 5, a representative perspective view of the first position of the driving unit provided in the subject matter mattress production line is given.

In FIG. 5, a representative perspective view of the driving unit (40), provided in the subject matter mattress production line (1), is given. Accordingly, in said driving unit (40), there is at least one lower conveyor (43) and at least one upper conveyor (42) provided at the upper vicinity of said lower conveyor (43). Said lower conveyor (43) is essentially a simple type conveyor. Said lower conveyor (43) takes the elements, used in mattress production, from the guidance conveyor (30) and transfers directly to the assembly unit (50). Said upper conveyor (42) is essentially positioned upwardly such that there is a mattress height between said upper conveyor (42) and the lower conveyor (43). The upper conveyor (42) is essentially positioned on the driving guide (41) and is configured to displace between a first position (I) and a second position (II). The upper conveyor (42) slides on said driving guide (41) and the position thereof can change. Said first position (I) is essentially the position where the upper conveyor (42) is positioned on the lower conveyor (43) (shown in FIG. 5). While the upper conveyor (42) is at the first position (I), it is adjacent to the guidance conveyor (30). Thanks to this, the carried mattress element can be transferred onto the upper conveyor (42).

Figure 6:
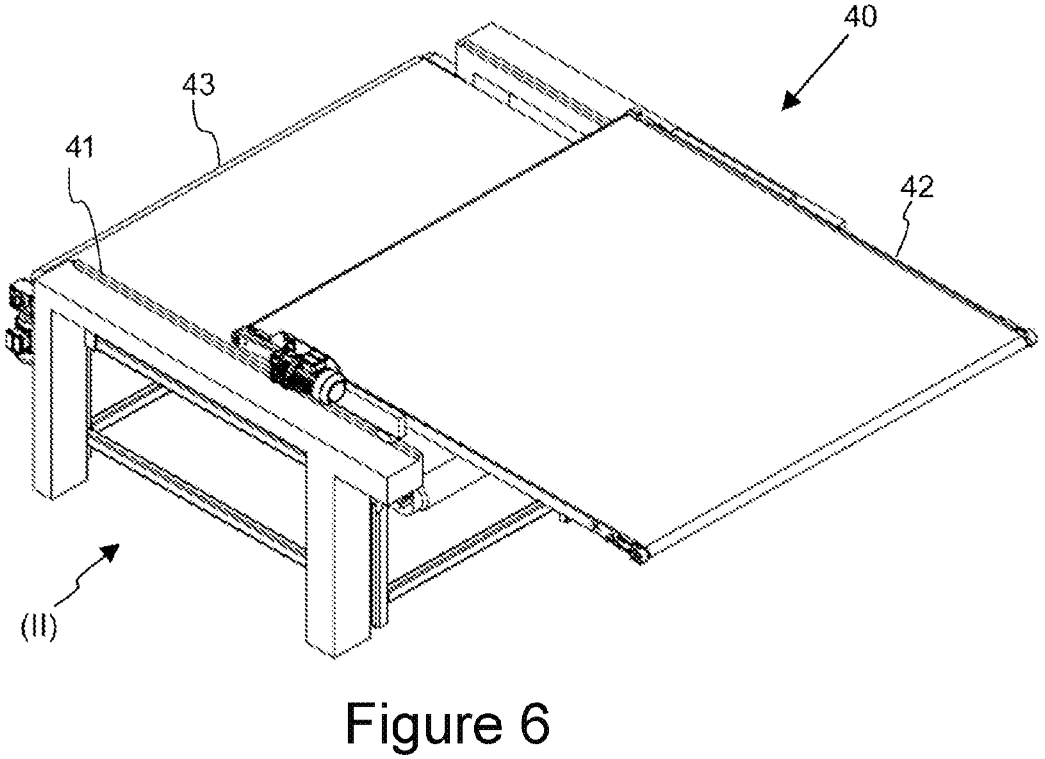
In FIG. 6, a representative perspective view of the second position of the driving unit provided in the subject matter mattress production line is given.

In FIG. 6, a representative perspective view of the second position (II) of the driving unit (40), provided in the subject matter mattress production line (1), is given. Accordingly, the second position (II) is the form where the upper conveyor (42) is slid towards the assembly unit (50) at least partially. The upper conveyor (42) can reverse and lye the first component and the second component onto a bending element positioned on the assembly unit (50). Thanks to this, the first component and the second component can be adhered with the bending element.

At the continuation of the driving unit (40), there is the assembly unit (50). Said assembly unit (50) is the part where the elements like the first component, the second component, the wedge and the bending element are adhered to each other. In this part, the mattress has been already shaped. At the continuation of the assembly unit (50), the mattress enters a press bridge (60). In the press bridge (60), the mattress is compressed by pressing the first component and the second component towards the bending element; and thanks to this, optimum adhesion is provided. In possible embodiments of the present invention, the assembly unit (50) can comprise a conveyor array having at least one first part (51) and at least one second part (52). Said first part (51) and said second part (52) are essentially one each conveyors and can function in two directions together. There is one each tilt arms (53) on the first part (51) and on the second part (52). Said tilt arms (53) are rotated on the first part (51) and on the second part (52) and can be rotated so as to make upside-down the bending element provided at the assembly unit (50). The tilt arms (53) can be used in the alternative production methods of the subject matter mattress production line (1).

In a possible mattress production in mattress production line (1), the first component is transferred to the guidance conveyor (30) after adhesive is applied thereon at the adhesion bridge (20). The guidance conveyor (30) passes the first component through the lower conveyor (43) of the driving unit (40) and transfers the first component to the assembly unit (50). In the assembly unit (50), wedges are adhered essentially to the edges of the first component. Meanwhile, the bending element is passed through the guidance conveyor (30). In this case, the guidance conveyor (30) gives the bending element to the upper conveyor (42) of the driving unit (40). The reason for giving the bending element to the upper conveyor (42) is that wedges have been fixed to the periphery of the first component. While the bending element is on the upper conveyor (42), it is passed from the first position (I) to the second position (II) and the upper conveyor (42) corresponds onto the first component. Afterwards, the upper conveyor (42) is again moved to the first position (I) and the bending element is left onto the first component. Meanwhile, the second component is passed through the adhesion bridge (20) and is given to the guidance conveyor (30). The guidance conveyor (30) transfers the second component to the upper conveyor (42) on the driving unit (40). While the upper conveyor (42) is passed from the first position (I) to the second position (II), the second component is begun to be adhered to the bending element through the adhesive corners. As the upper conveyor (42) is passed to the second position, the second component is folded onto the bending element and continues adhering. Thanks to this, the second component is joined by means of the bending element and the wedges, and the mattress is produced in the assembly unit (50). After this part, the mattress is transferred to the press bridge (60) and provides application of press onto the adhering parts. By means of the press bridge (60), the adhesion quality of the mattress is improved.

Figure 2:
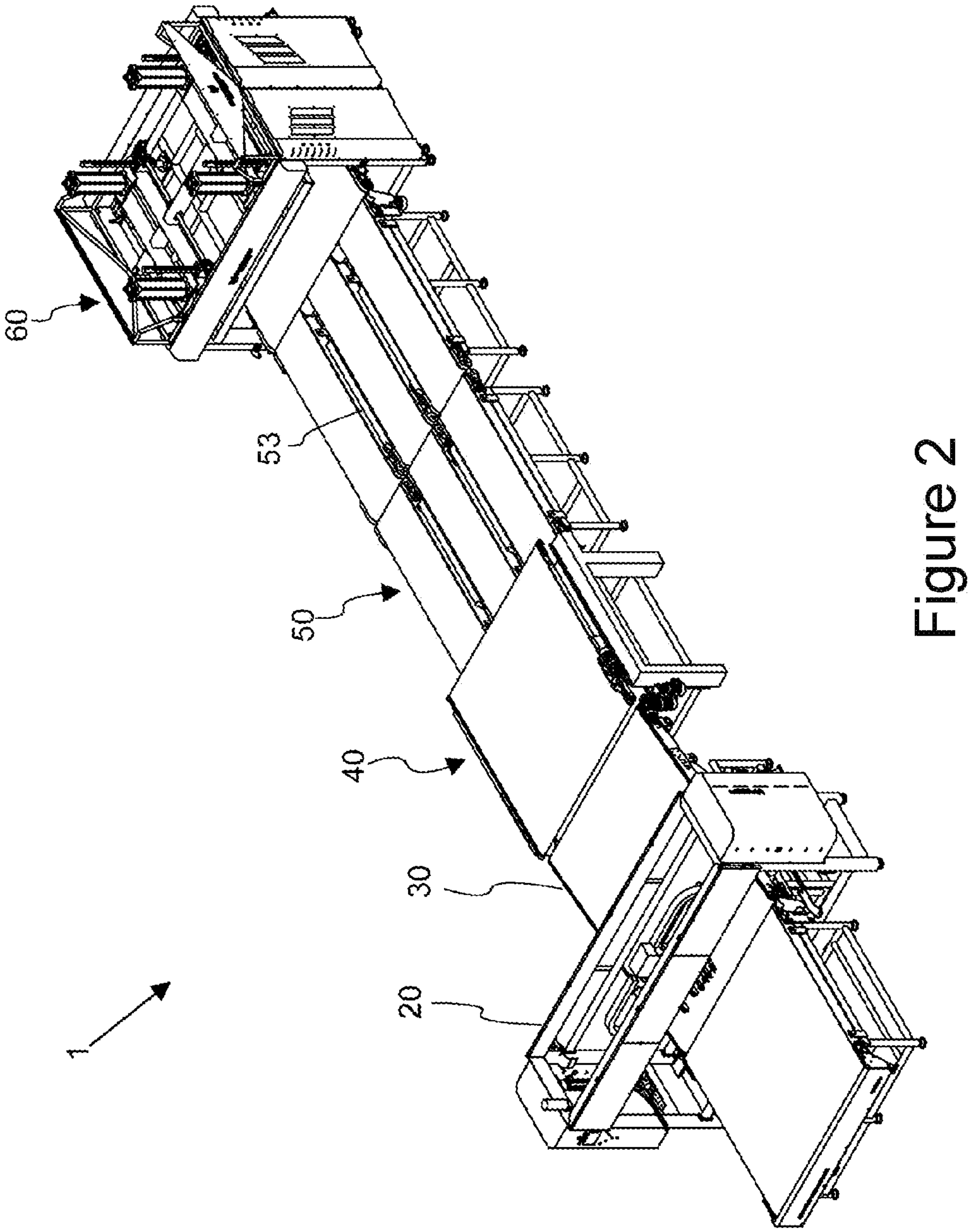
In FIG. 2, another representative perspective view of the subject matter mattress production line is given.

In FIG. 2, another representative perspective view of the subject matter mattress production line (1) is given. In this view, an alternative embodiment of the mattress production line (1) is given. In this alternative embodiment, the assembly unit (50) has a first part (51) and the second part (52). And there is one each tilt arms (53) thereon. Depending on this, when a mattress is produced, first of all, the bending element gives to the guidance conveyor (30). The guidance conveyor (30) passes the bending element through the lower conveyor (43) of the driving unit (40) and transfers to the assembly unit (50). Meanwhile, the first component is passed through the adhesion bridge (20) and the guidance conveyor (30). In this case, the guidance conveyor (30) gives the first component to the upper conveyor (42) of the driving unit (40). As the upper conveyor (42) passes from the first position (I) to the second position (II), the first component is held and adhered to the bending element through the adhesive corners thereof. As the upper conveyor (42) is passed to the second position (II), the first component is folded onto the bending element and continues adhesion. Afterwards, roll-over is realized in the assembly unit (50) by means of the mattress tilt arms (53). In this case, the first component is passed to the lower part of the bending element. Meanwhile, the second component is passed through the adhesion bridge (20) and is given to the guidance conveyor (30). The guidance conveyor (30) transfers the second component to the upper conveyor (42). The upper conveyor (42) applies the adhesion process, applied for the first part (51), also for the second component. Thanks to this, the mattress types, which do not include wedge in the assembly unit (50), can be produced, or the assembling of the additional layers of mattresses of which the wedging is finished can be realized. Afterwards, the mattress is transferred to the press bridge (60) and pressure is applied onto the adhering parts. Thanks to this, adhesion quality is improved.

In the invention, said conveyors can be essentially known in the art and can have a structure which has a band thereon and a drive element which moves the band. Depending on the need, movement capability in two directions can be provided.

By means of all these embodiments, the system is mechanized by decreasing operator intensity in mattress production. As the system is mechanized, the faults are reduced and wastage proportions are reduced. Besides, the operator intensity is reduced and thereby, labor is also saved.

The protection scope of the present invention is set forth in the annexed claims and cannot be restricted to the illustrative disclosures given above, under the detailed description. It is because a person skilled in the relevant art can obviously produce similar embodiments under the light of the foregoing disclosures, without departing from the main principles of the present invention.

REFERENCE NUMBERS

1 Mattress production line
10 Keeping part
20 Adhesion bridge
30 Guidance conveyor
31 Conveyor body
32 Drive element
33 Hinged arm
34 Guide
40 Driving unit
41 Driving guide
42 Upper conveyor
43 Lower conveyor
50 Assembly unit
51 First part
52 Second part
53 Tilt arm
60 Press bridge

What is claimed is:

1. A mattress production line for use in mattress production, comprising at least one adhesion bridge, at least one assembly unit provided in a vicinity of the adhesion bridge and where parts, forming a mattress, are joined, wherein in order to provide transfer of a bending element used in mattress production and of a first component and of a second component, which can essentially be positioned on mutual sides of the bending element, to an assembly unit within a predetermined arrangement;

the mattress production line comprises a driving unit having at least one lower conveyor and at least one upper conveyor positioned at an upper vicinity of the lower conveyor, and at least one guidance conveyor configured to feed the element, which forms the mattress, to at least one of the lower conveyor and the upper conveyor in the driving unit.

2. The mattress production line according to claim 1, wherein in order to provide adhering by reversing at least one of a first component and a second component, whereon adhesive is applied, onto a bending element provided at the assembly unit, the upper conveyor is configured to be at least partially moved between at least one first position, provided in a vicinity of the guidance conveyor at the driving unit, and at least one second position, where the upper conveyor is approached towards the assembly unit.

3. The mattress production line according to claim 1, wherein at least one tilt arm is provided in the assembly unit.

4. The mattress production line according to claim 1, wherein at least one press bridge is provided in a vicinity of the assembly unit.

5. The mattress production line according to claim 1, wherein-staid the guidance conveyor is configured to be aligned with the lower conveyor and with the upper conveyor at the side of the guidance conveyor facing the driving unit.

6. The mattress production line according to claim 5, wherein the guidance conveyor is positioned on at least one conveyor body, and a height of the guidance conveyor is changeable by means of moving at least one hinged arm provided between the conveyor body and the guidance conveyor.

7. The mattress production line according to claim 1, wherein at least one keeping part, where the mattress components can be kept, is provided.

* * * * *